(12) United States Patent
Yiu et al.

(10) Patent No.: US 8,543,675 B1
(45) Date of Patent: Sep. 24, 2013

(54) CONSISTENT LINK SHARING

(75) Inventors: Tomi Yiu, Seattle, WA (US); Jonathan A. Jenkins, Seattle, WA (US); Mark S. Baumback, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 458 days.

(21) Appl. No.: 12/641,059

(22) Filed: Dec. 17, 2009

(51) Int. Cl.
G06F 17/30 (2006.01)

(52) U.S. Cl.
USPC .......................................... 709/223; 709/245

(58) Field of Classification Search
USPC .................................................. 709/223, 245
See application file for complete search history.

(56) References Cited

U.S. PATENT DOCUMENTS

| | | | |
|---|---|---|---|
| 7,127,524 B1 * | 10/2006 | Renda et al. | 709/245 |
| 7,523,096 B2 * | 4/2009 | Badros et al. | 705/7.29 |
| 7,908,317 B2 * | 3/2011 | Musson | 709/203 |
| 7,908,551 B2 * | 3/2011 | Yao et al. | 715/236 |
| 8,255,480 B2 * | 8/2012 | Bedingfield et al. | 709/217 |
| 8,296,664 B2 * | 10/2012 | Dixon et al. | 715/760 |
| 2007/0124500 A1 * | 5/2007 | Bedingfield et al. | 709/245 |
| 2009/0006109 A1 * | 1/2009 | Martinez et al. | 705/1 |

* cited by examiner

Primary Examiner — Kim Nguyen
(74) Attorney, Agent, or Firm — Lee & Hayes, PLLC

(57) ABSTRACT

Consistent link sharing is implemented on one or more share servers. Consistent link sharing includes receiving a request from a user to store a web page that resides on an originating server to one or more share servers. The request includes a universal resource locator (URL) of the web page, which is a web page stored on the share servers of a content distribution network. The share servers generate a replacement URL for future access to the stored web page. The replacement URL may be shared with one or more users. The share servers provide the stored web page to a user who submits the replacement URL.

41 Claims, 11 Drawing Sheets

CONSISTENT LINK SHARING

BACKGROUND

Internet users often like to share interesting or informative web content they have discovered online with friends, family, co-workers, customers, or business associates. In most instances, Internet users may choose to share such web content by sending a uniform resource locator (URL), commonly referred to as a "link", of the web page that contains the web content of interest to a recipient Internet user. However, because web content on the Internet may constantly change, links to web pages or web content may become invalid as such web pages or web content are moved, deleted, or updated.

Thus, recipient Internet users of such invalid links may experience frustration with their web browsing experience. In some instances, recipient of such invalid links may confuse the inability of such invalid links to retrieve the desired web content with hardware or software performance problems, and/or network connectivity outages. This confusion may cause the recipient Internet user to waste time by attempting to troubleshoot non-existent problems, repeating attempts to connect to the desired web content via the invalid link, and/or unsuccessfully searching for removed web content in a linked web page. In other instances where the invalid links are shared with business associates and customers, the invalid links may result in loss of productivity, damage to business reputation or relations, or loss of potential sales or profits.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

The disclosure is directed, in part, to implementation of consistent link sharing that enables the archival storage of one or more web pages from various websites on a storage server, as well as the generation of replacement universal resource locators (URLs), or replacement "links", to those stored web pages. The replacement URLs may enable the subsequent retrieval of the one or more web pages from the storage server. Accordingly, Internet users may use the replacement URLs to retrieve the one or more stored web pages as they existed at the time of storage even after the one or more original counterparts of the stored web pages have been modified, deleted, or updated.

In this way, Internet users may be assured that the web pages, or the web content in the web pages, are preserved in their existing states for a desired time period. Moreover, the Internet users may be further assured that the replacement URLs that they provide to other recipient Internet users may reliably point to the web pages or web content they wish to share. Thus, consistent link sharing may enable Internet user to take advantage of the dynamic and up-to-date nature of web content on the Internet, while mitigate the negative impact of obsolete or out-of-date links.

In some embodiments, consistent link sharing may be implemented as a server-side link share application that presents its functionalities as web content. The web content may be displayed on a web browser that resides on an electronic device that providing web browsing functionalities. In other embodiments, consistent link sharing may be implemented via a client-side application that resides on the electronic device. The client-side application may be accessible via a user interface of a web browser of the electronic device. In such embodiments, the electronic device may be a general purpose computer, a portable computer, a home theater personal computer, a dedicated web browsing appliance, and/or the like.

Illustrative System Architecture

Figure 1:
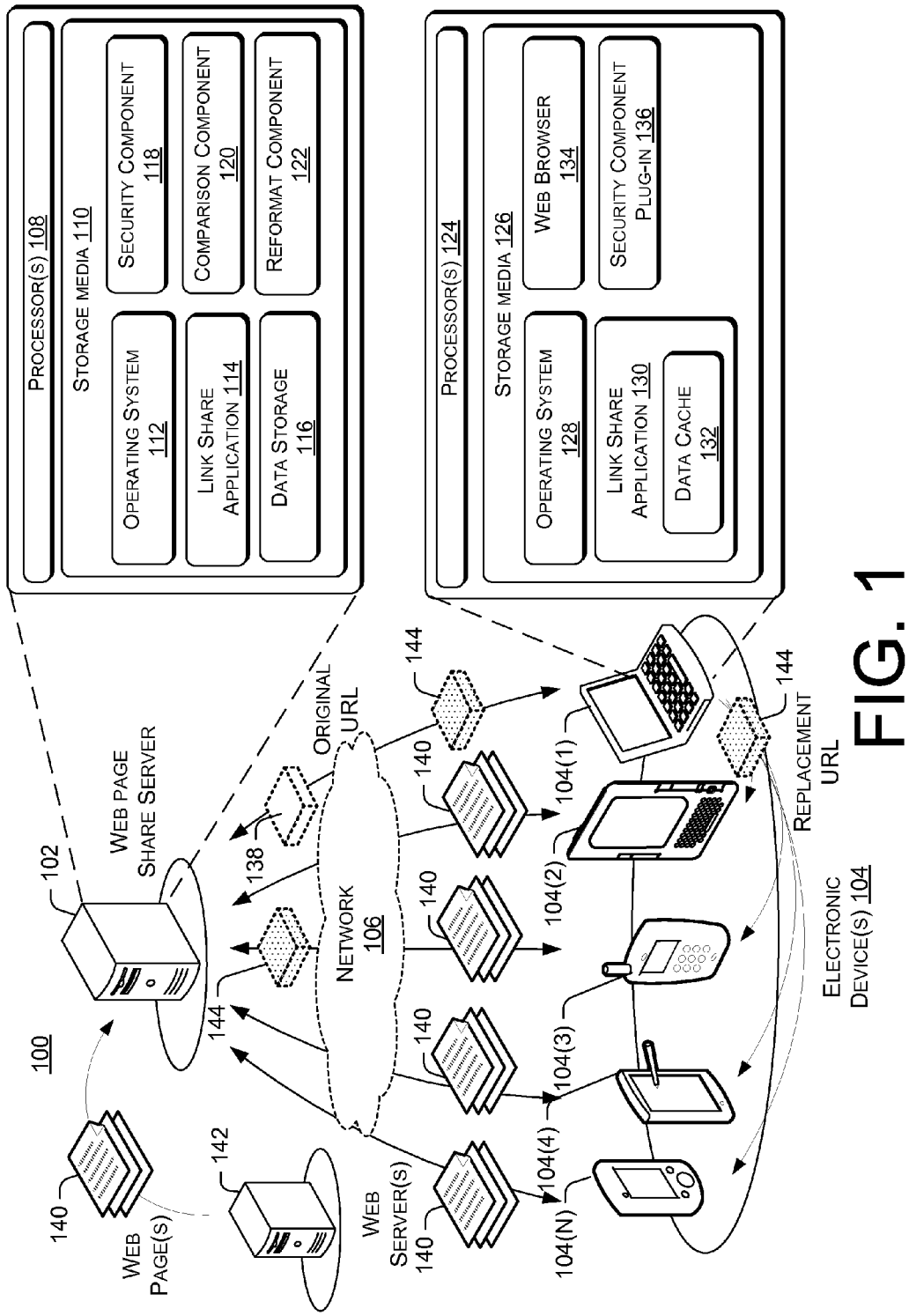
FIG. 1 shows an illustrative computing environment in which one or more embodiments of consistent link sharing may be implemented.

FIG. 1 shows an illustrative computing environment 100 in which one or more embodiments of the consistent link sharing may be implemented. The environment 100 may include one or more share servers 102 and a plurality of electronic devices 104 that are communicatively connected by a network 106. The one or more share servers 102 may be located in a single data center, or across multiple data centers. The one or more data centers may be part of a content distribution network (CDN). In some embodiments, the one or more share servers 102 may be distributed at "edge locations" on the CDN to use multiple network backbones of the network 106. In this way, the speed of content distribution from and to the one or more share servers 102 may be increased.

The electronic devices 104 may include a portable computer 104(1), an electronic book (eBook) reader device 104(2), a mobile phone 104(3), a tablet computer 104(4), a personal digital assistant (PDA) 104(N), and/or other electronic devices that are equipped with network communication components, data processing components, and electronic displays for displaying data.

The network 106 may be a local area network ("LAN"), a larger network such as a wide area network ("WAN"), or a collection of networks, such as the Internet. Protocols for network communication, such as TCP/IP, may be used to implement the network 106. Although embodiments are described herein as using a network such as the Internet, other distribution techniques may be implemented.

As shown in FIG. 1, each of the one or more share servers 102 may include one or more processors 108 and a storage media 110. A plurality of modules may be stored in the storage media 110. The modules may include routines, programs, objects, components, and data structures that cause the each server 102 to perform particular tasks. In various embodiments, the modules may include an operating system 112, a server-side link share application 114 that includes a data storage 116, a security component 118, a comparison component 120, and a reformat component 122.

The operating system 112 may include components that enable an electronic device 104 to receive data via various inputs (e.g., user controls, network interfaces, and/or memory devices), and process the data using the one or more processors 108 to generate output. The operating system 112 may include a display component that presents the output (e.g., display an image on an electronic display, store data in memory, transmit data to another electronic device, etc.). Additionally, the operating system 112 may include other components that perform various other functions generally associated with an operating system.

Likewise, each of the electronic devices 104 may include one or more processors 124 and a storage media 126. A plurality of modules may be stored in the storage media 126 of each electronic device 104. The modules may include routines, programs, objects, components, and data structures that cause the electronic device to perform particular tasks. In various embodiments, the modules may include an operating system 128, a client-side link share application 130 that includes a data cache 132, a web browser 134, and a security component 136.

Each of the electronic devices 104 may further include user controls that enable a user to interact with the device. User controls may include, but are not limited to, combinations of one or more of keypads, keyboards, mouse devices, touch screens, microphones, speech recognition packages, and any other suitable devices or other electronic/software selection methods. Moreover, as further described below, each of the electronic devices 104 may also include a memory for storing a client-side application and its associated product and service data.

The server-side link share application 114 may provide consistent link sharing functionalities. The application 114 may enable an Internet user to send an original URL 138 of a web page 140 that is stored on one or more originating web servers 142 to the server-side link share application 114. For example, the Internet user may use the electronic device 104(1) to send the original URL 138 to the application 114. In turn, the server-side link share application 114 may automatically extract and store the web page 140 to the one or more share servers 102. In various embodiments, the server-side link share application 114 may store the web page 140 as an image (e.g., TIFF image). Alternatively, the application 114 may store the web page 140 by saving the various static and/or dynamic objects that make up the web page, so that the web page 140 may be reconstructed upon demand. Moreover, the application 114 may also generate a replacement URL 144 that links to the stored web page 140. Subsequently, the application 114 of each electronic may enable the same Internet user or a different Internet user to use the replacement URL 144 to access the stored web page 140. For example, the user of the electronic device 104(2) may access the stored webpage 140 using the replacement URL 144.

In such embodiments, an Internet user may interact with the server-side link share application 114 via the web browser 134 of an electronic device, such as one of the electronics devices 104(1)-(N). For example, the Internet user may use the web browser 134 to view one or more user interface pages that present the functionalities of the server-side link share application 114.

In some of such embodiments, each of the user interface pages may include HTML objects, script objects, Cascade Style Sheet (CSS) objects, image objects, and/or other static and/or dynamic objects (e.g., algorithms) that implement the consistent link sharing functionalities. These objects may be downloaded from the one or more share servers 102 and assembled by the web browser 134.

In other embodiments, the server-side link share application 114 may interact with the client-side link share application 130. In such embodiments, the application 130 may provide one or more interfaces on a user interface (e.g., tool menu) of the web browser 134. The one or more interfaces may enable an Internet user to direct the application 130 to the original URL 138 of interest. The client-side link share application 130 may then store the web page 140 that has the URL 138 into its data cache 132. Subsequently, the application 130 may transfer the stored web page 140 to the one or more server 102, as well as generate and transfer to the application 114 the replacement URL 144 that enables the retrieval of the stored web page 140.

However, in alternative embodiments, the client-side link application 130 may be a plug-in extension of the server-side link share application 114. In at least one of such embodiments, the application 130 may provide one or more interfaces on a user interface of the web browser 134 that enable the Internet user to direct the server-side share link application 114 to an URL 138 of interest. In turn, the server-side link share application 114 may use the URL 138 to retrieve and store the web page 140 to the one or more share servers 102, as well as generate the replacement URL 144.

The security component 118 residing on the one or more share servers 102 may cooperate with the server-side link share application 114 to protect the stored web page 140 from unauthorized access. For example, the security component 118 may protect the stored web page 140 from being accessed by an Internet user who obtained the replacement URL 144 without permission.

In some embodiments, the security component 118 may provide an Internet user with the ability to password protect the stored web page 140. In this way, the Internet user may deter unauthorized access to the web page 140 by supplying the password to a recipient Internet user independently of the replacement URL 144. For example, the Internet user may send the replacement URL to the recipient Internet user via an email, but text message the password to the recipient Internet user. Subsequently, when the recipient Internet user desires to access the stored web page via the replacement URL 144, the security component 118 may authenticate the recipient Internet user via the password prior to allowing the server-side link share application 114 to provide the stored web page 140 to the recipient Internet user. Thus, a non-recipient Internet user who is not privy to the password is unable to access the stored web page 140 even when the replacement URL 144 is intercepted and used by the non-recipient Internet user.

In other embodiments, the security component 118 may protect the stored web page 140 by providing the Internet user with the ability to set a duration for which the stored web page 140 may be retrieved. For example, but not as a limitation, the duration may be set in terms of days, weeks, months, or years.

In further embodiments, the security component 118 may protect the stored web page 140 by providing the Internet user with the ability to preset the number of times that the stored web page 140 may be accessed. In some of such embodiments, the security component 118 may limit the number of unique browser sessions that can access the stored web page 140 based on the preset number. For example, unique browser sessions may refer to browser sessions with different session identifiers. For example, if the set number is 10, the security component 118 may permit the server-side link share application 114 to provide the stored web page 140 to 10 unique browser sessions prior to permanently terminating access to the stored web page 140.

Likewise, the security component 118 may also implement access constraint based on unique Internet Protocol (IP) addresses of the electronic devices 104. For example, once again if the preset number is ten, the security component 118 may permit the server-side link share application 114 to provide the stored web page 140 to ten electronic devices 104 with ten different IP addresses. Subsequently, the security component 118 may deny access to the stored web page 140 by electronics devices with other IP addresses. In such an example, it will be appreciated that the security component 118 may permit each electronic device 104 to be provided access to the stored web page 140 multiple times, as long as the particular electronic device 104 holds the same IP address.

Further, the security component 118 may also implement access constraint based on unique identifiers of the Internet users that desire to access the stored web page 140, and/or other unique identifiers of their corresponding web browsing software or hardware. The identifiers may include, but are not limited to, names, email addresses, or user logins, electronic certificates, unique electronic device identifiers, operating system product keys of the Internet users that are supplied to the security component 118. The identifiers may further include cookie information (unique user identifiers) stored in the browsers of the Internet users, and/or the like.

In other embodiments, each of the identifiers may be a combination or hashes of the information described above. For example, the combinations or hashes may include a hash of unique browser session identifier and login name, a combination of IP address and password, a hash of unique browser session identifier, email address, and the like. In additional embodiments, the security component 118 may further protect the stored web page 140 by providing the Internet user with the ability to designate the one or more recipient Internet users that are permitted to access the stored web page 140 through the replacement URL 144. The security component 118 may enable the Internet user to designate the one or more permissible Internet users via unique user identifiers (e.g., pre-registered login identifications, cookie information, email addresses, electronic certificates, etc.).

The security component 118 may also enable the Internet user to designate the one or more permissible Internet users via identifying component characteristics of the web browsing software, hardware, or network that is utilized by the recipient Internet users for web browsing. For example, such identifying component characteristics may include IP addresses, electronic device identifiers, operating system product keys, or the like. In still other such embodiments, a combination or a hash of at least one user identifier and/or at least identifying characteristic of each recipient Internet user may be used by the security component 118 for authenticated access to the stored web page 140 via the replacement URL 144.

In still other embodiments, the security component 118 may enable the Internet user to protect the stored web page 140 using a combination of at least two techniques described above in the embodiments. For example, the security component 118 may protect the web page 140 by using a combination of at least two of limitation on availability duration, limitation on the number of accesses, or authentication of the Internet users that desires to access the stored web page 140 via the replacement URL 144.

Thus, to facilitate the operation of the security component 118, each of the server-side link share application 114 and the client-side link share application 130 may generate data input interfaces (e.g., input boxes, pull-down menus, checkboxes, radio buttons, etc.) that are displayed in the web browser 120. Such data input interfaces may enable the Internet user to enter authentication data (e.g., password) and settings to control access to the stored web page 140. The data input interfaces may also enable recipient user authenticate to the security component 118 to gain access to the stored web page 140. Each of the server-side link share application 114 and the client-side link share application 130 may also provide the data and settings to the security component 118.

The comparison component 120 may be used by the server-side link share application 114 to verify that an original version of the stored web page 140 is no longer available on the originating web server 142. The application 114 may perform this verification prior to providing the stored web page 140 to a requesting Internet user.

In various embodiments, the comparison component 120 may initially obtain a current version of the web page 140 from the originating web server 142. Subsequently, the comparison component 120 may be compared to the current version to the stored web page 140. If the current version of the web page 140 differs from the stored web page 140, the server-side link share application 114 may provide the stored web page 140 to the requesting Internet user. However, if the current version of the web page 140 is identical to the stored version of the web page, the application 114 may redirect the web browser 134 that originated the replacement URL 144 to download the current version of the web page 140. In some instances, the ability to "pass through" the request for the stored web page 140 to the originating web server 142 may conserve the computing resources of the share servers 102. In some of the embodiments, the comparison component 120 may convert the current version of the web page 140 and the stored web page 140 into the same representational format (e.g., images) to perform the comparison.

However, under some special conditions, the server-side link share application 114 may provide the stored web page 140 even when the comparison component 120 determines that the current version of the web page 140 is identical to the stored version. In some embodiments, the server-side link share application 114 may perform such an action when directed by a user via a user selectable option that is displayed on a user interface page to always provide the stored web page 140. In additional embodiments, the application 114 may perform such an action when the originating web server 142 fails to provide the current version of the web page 140 to the web browser 134 after a predetermined period of time has passed (e.g., 15 seconds). In still other embodiments, the server-side link share application 114 may perform such an action when the application 114 is directed to provide additional information to the Internet user via the web browser 134, so that the additional information may be presented in conjunction with stored web page 140. For example, the additional information may be superimposed on or proximate to a portion of the stored web page 140 during the presentation via the web browser 134. The additional information may include advertisements, news announcements, service information, security warnings, and/or the like.

The server-based reformat component 122 may modify each of the stored web pages, such as the stored web page 140, to fit the proportions (e.g., pixel dimensions) of an electronic display on an electronic device 104. For example, in an instance where the stored web page 140 includes static and/or dynamic objects that are formatted for display on a desktop monitor, the application 114 may use the reformat component 122 to reformat the static and/or dynamic objects of the web page 140.

The data storage 116 may store a plurality of web pages 140 that are obtained from the web servers 142. In embodiments where the one or more share servers 102 are part of a content distribution network, the data storage 116 in each the share server 102 may store at least a portion of each web page 140. The data storage 116 also store replacement URLs, such as the replacement URL 144. The data storage 116 may also store metadata that associates with each stored web page 140. Such metadata may include, but is not limited to, the URL where each stored web page 140 is originally obtained, access control information for each web page 140, location in the one or more share servers 102 where each web page 140 may be stored, as well as any additional data used by each of the share servers 102.

It will be appreciated that the server-side link share application 114 and the client-side link share application 130 are also capable of storing and providing access to a plurality of web pages 140 of interest. In various embodiments, at least one of the application 114 or the application 130 may store the plurality of web pages 140 as a series of images, and/or as a series of static and/or dynamic objects that enables the reconstitution of the plurality of web pages 140. Further, in some embodiments, the application 114 and/or the application 130 may selectively store each web page 140 to at least one share server 102 that is at an edge location of a CDN that is closest to the Internet user or the one or more recipient Internet users. For example, the share server 102 may be selected based on fewest hops, fewest number of network seconds from the location of the Internet user, and/or the like. In this way, storage and the distribution speed for the web pages 140 may be increased.

Server-Side Link Share Implementations

Figure 2:
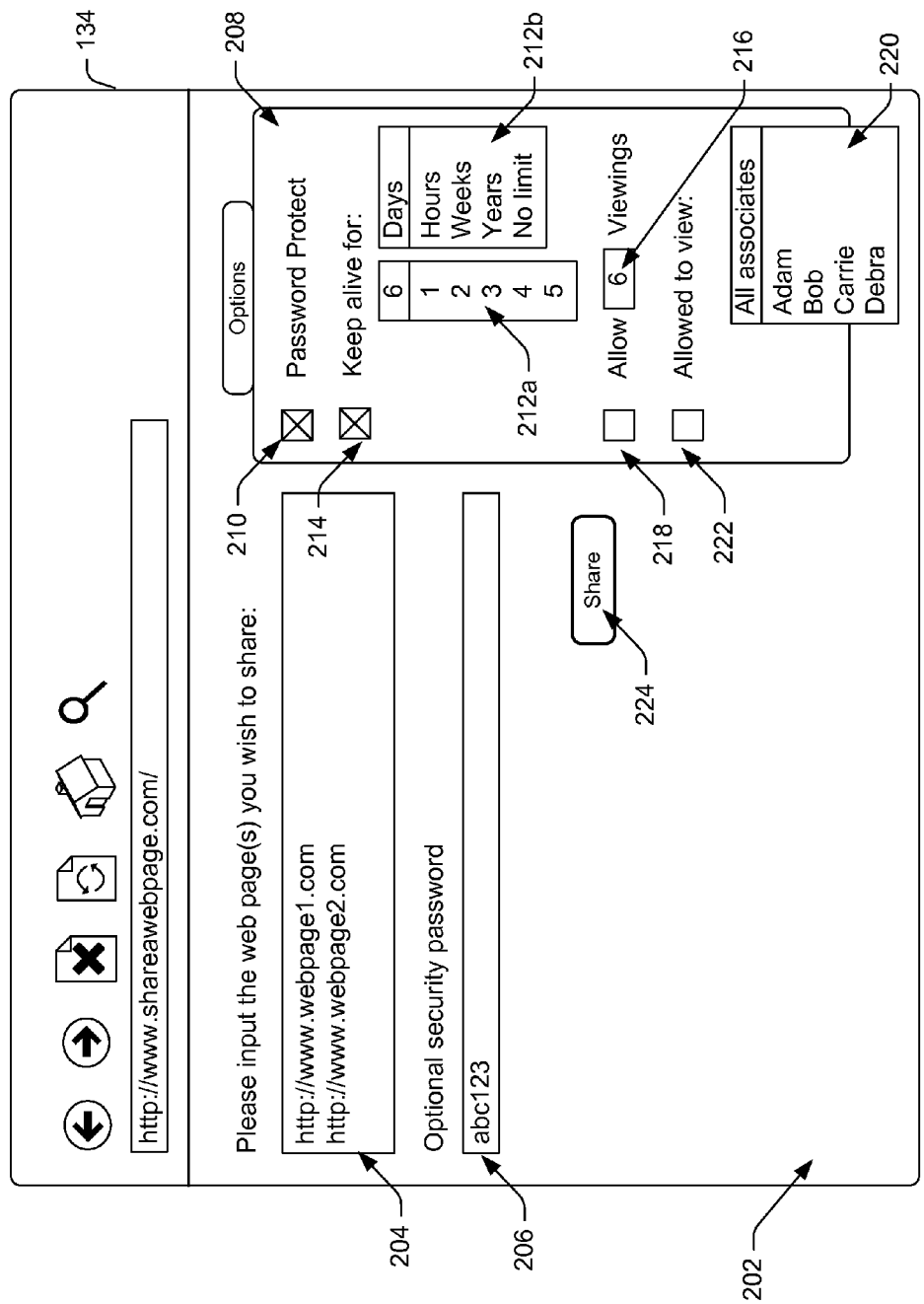
FIG. 2 shows an illustrative screenshot of link input interface of a server-side link share application that implements consistent link sharing.
Figure 3:
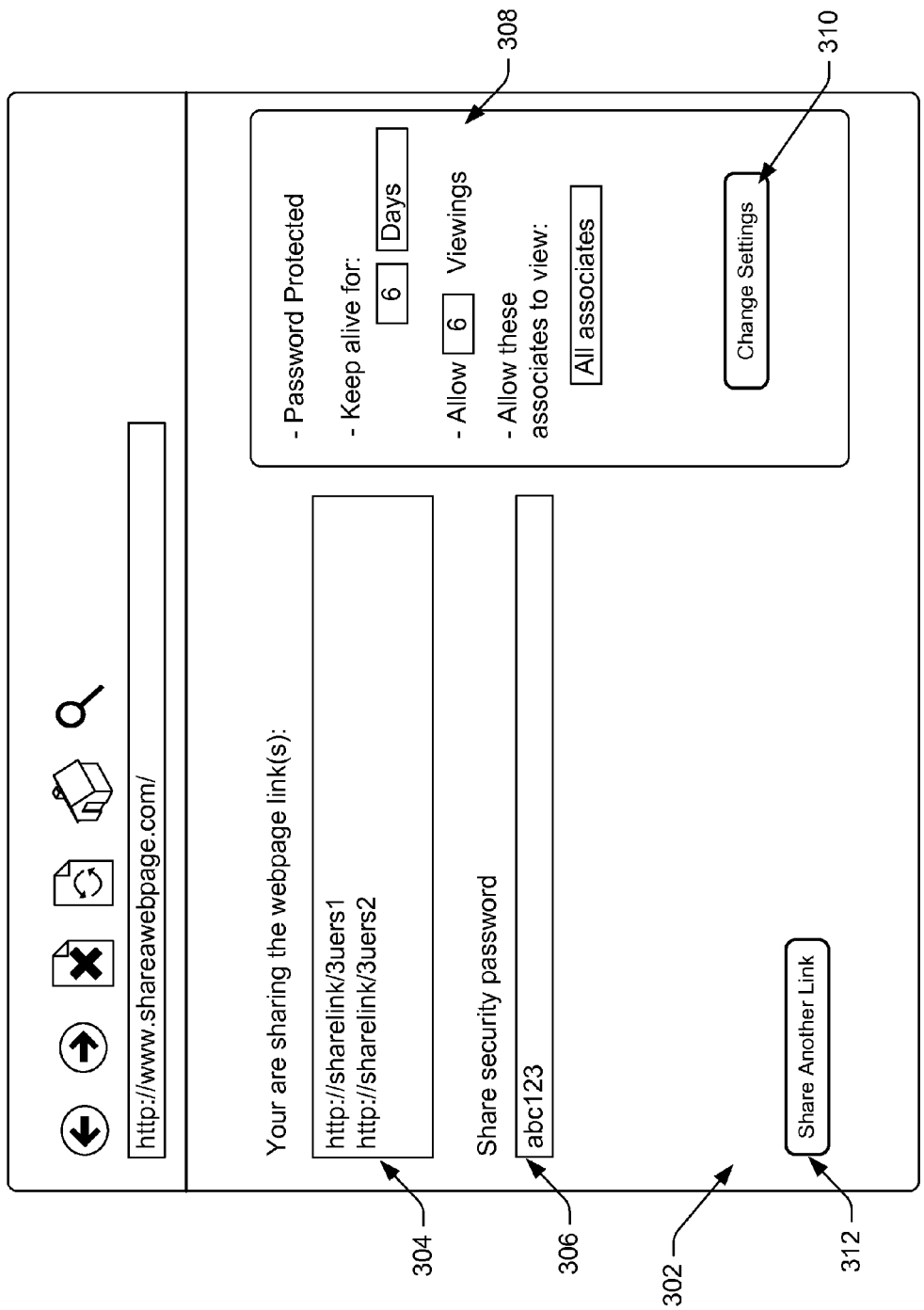
FIG. 3 shows an illustrative screenshot of a user interface page that may be displayed subsequent to the submission of link information to a server-side link share application.
Figure 4:
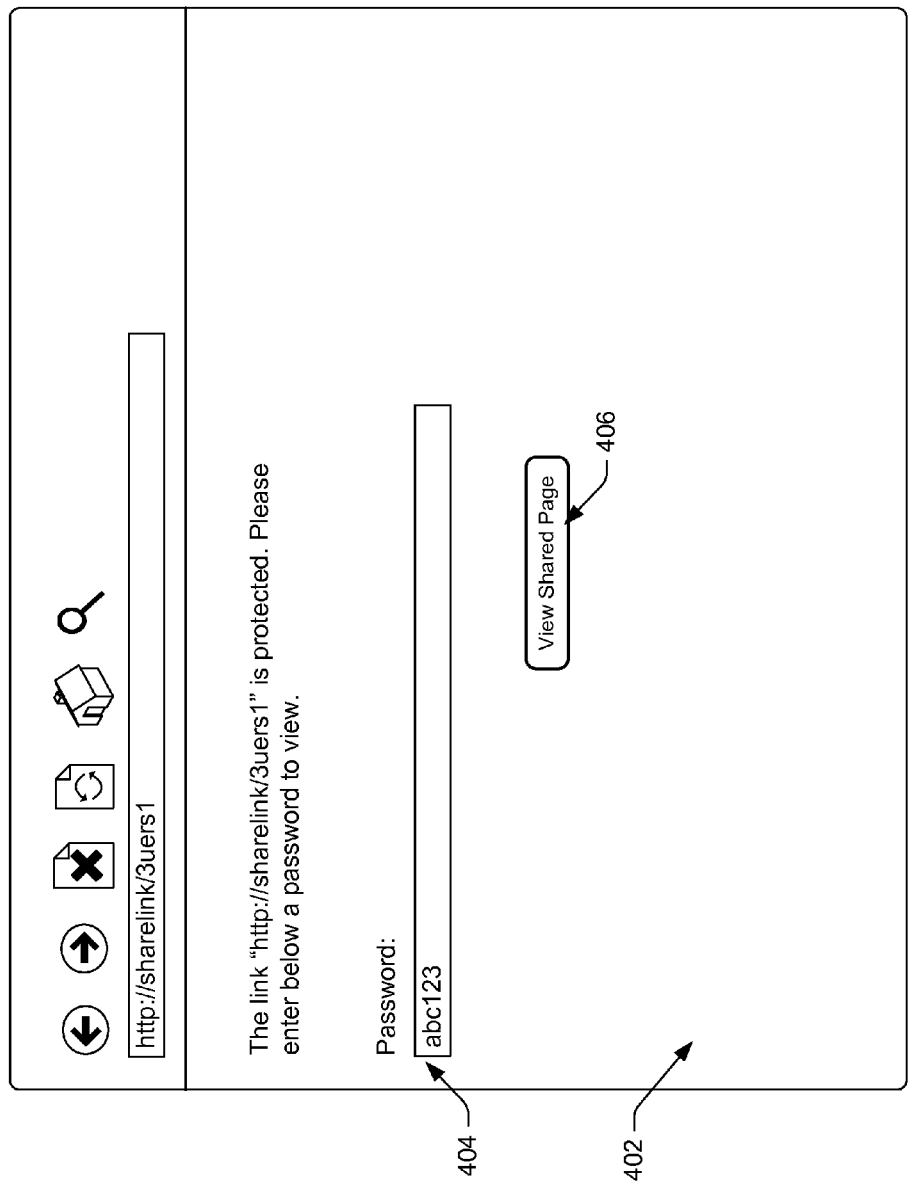
FIG. 4 shows an illustrative screenshot of link output interface of a server-side link share application that implements consistent link sharing.

FIGS. 2-4 show illustrative screenshots of consistent link sharing that is facilitated by a server-side link share application. As shown in of FIG. 2, the server-side link share application 114 may cause the web browser 134 on the client devices 104 to display a user interface page 202. The user interface page 202 may include an address portion 204 that enables the Internet user to enter one or more URLs 138 of at least one web page 140 to be stored into the one or more share servers 102. For example, as shown in FIG. 2, the Internet user may enter the web addresses "http://www.webpage1.com" and "http://www.webpage2.com" into the address portion 204, where these web addresses correspond to two different web pages. Additionally, the user interface page 202 may further include a password field 206 that enables the Internet user to associate the web pages 140 with a password. For example, the Internet user may enter a password (e.g., "abc123") into the password field 206.

The user interface page 202 may further include an option menu 208, which enables the Internet user to further configure the access settings for the web pages 140. The access settings may be used by the security component 118. The option menu 208 may include a check box 210 that enables the Internet user to activate (e.g., check) or deactivate (e.g., uncheck) password protection for the web pages 140. In some embodiments, the activation of the password protection checkbox 210 may automatically generate a password when no previous password has been entered into the password field 206. The automatically generated password may be displayed in the password field 206.

In other embodiments, the option menu 208 may include pull down menus 212a and 212b that enables the Internet user to set the duration that the one or more stored web pages 140 is available for access. The internet user may activate or deactivate the pull down menus 212a and 212b via checkbox 214. In such embodiments, the pull down menu 212a may enable the Internet user to designate a numerical value (e.g., 1-10) for the duration of availability. Moreover, the pull down menu 212b may enable the Internet user to designate unit (e.g., days, weeks, months, etc.) for the duration of availability. At the end of the duration, the security component 118 may permanently terminate access to the one or more stored web pages 140 for all Internet users.

In additional embodiments, the option menu 208 may include a numeral input box 216 that enables the Internet user to set the number of times that the web pages 140 may be accessed. The Internet user may activate or deactivate the numeral input box 216 via the checkbox 218. In some of these additional embodiments, the number of times may be with respect to "unique" accesses. For example, an Internet user may download the stored web pages 140 multiple times over a period of time. However, since the multiple downloads are "unique" to that particular Internet user, the multiple downloads may be counted as a single "unique" access. In another example, the multiple downloads by the Internet user may be considered as a single "unique" access when the multiple downloads are performed by the Internet User using the same electronic device 104. In such embodiments, the number of "unique" accesses may be determined based on Internet user identifiers (e.g., names, email addresses, user logins, electronic certificates, etc.) and/or component characteristics (e.g., operating system product keys, device identifiers, static IP addresses), as described above.

In other of these additional embodiments, the number of times may be with respect to cumulative accesses. In other words, a number that is inputted into the numeral input box 216 may represent the count of total accesses that may be performed, regardless of the access request origins. In such additional embodiments, once the number of accesses designated in the numeral input box 216 is reached, the security component 118 may terminate access to the one or more stored web pages 140 for all Internet users.

In further embodiments, option menu 208 may include a pull down menu 220 that enables the Internet user to designated one or more recipient Internet users that may have access to the stored web pages 140. The Internet user may activate or deactivate the pull down menu 220 via the checkbox 222.

In such further embodiments, the pull down menu 220 may include a group of potential recipient Internet users that may be granted access to the at least one stored web page 140. Accordingly, one or more of the potential Internet users may be selected via the pull down menu 220. Moreover, each of the potential recipient Internet users may be associated with a unique identifier (e.g., a name, an email address, a user login, an electronic certificate, etc.) that is pre-registered with the security component 118. Thus, the security component 118 may use the one or more identifiers that correspond to the one or more selected recipient Internet users to grant access to the web pages 140.

In other embodiments, rather than including a group of potential Internet users that may be granted access, the pull down menu 220 may include a group of electronic devices 104 that may be used to access the one or more stored web pages 140. Thus, in such embodiments, the menu item "Adam" in the pull down menu 220 may instead be the menu item "Adam's computer", and the menu item "Bob" may instead be "Bob's smart phone." Moreover, each of electronic devices 104 in the pull down menu 220 may be associated with a unique component identifier (e.g., an operating system product key, device identifier, static IP address) that is pre-registered with the security component 118. Thus, the security component 118 may use the one or more component identifiers that correspond to the one or more electronic devices 104 to grant access to the web pages 140.

It will be appreciated that one or more of the access settings in the option menu 208 may be combined in other embodiments to regulate access to the web pages 140. For example, password protection may be combined with access duration limitation, and/or with limitations on number of access requests, and so and so forth. Furthermore, the Internet user may be free to deactivate all of the access control options in the option menu 208 to permit unrestricted access.

Moreover, the various checkboxes, pull down menus, input boxes, as described with respect to the option menu 208, may be substituted with other menu interfaces, provided that the security component 118 receives the appropriate access control data. For example, the password checkbox 210 may be replaced with a radio button. In other examples, the pull down menus 212a and 212b may be replaced with input boxes for alphanumeric data, and so on and so forth.

Thus, once the Internet user has inputted the URLs of web pages 140 to be stored and configured the appropriate recipient access settings, the Internet user may submit the inputted information to the server-side link share application 114 and/or the security component 118. In at least one embodiment, the Internet user may submit the inputted information via a submission button 224 of the user interface page 202.

FIG. 3 shows an illustrative screenshot of a user interface page 302 that may be displayed by the web browser 134 subsequent to the submission of the inputted information to the server-side link share application 114 and/or the security component 118.

In various embodiments, the server-side link share application 114 may display the user interface page 302 after storing the one or more web pages 140 in the share servers 102. The server-side link share application 114 may store each web page 104 by navigating to the web pages 140 on the originating web server 142 via the corresponding URLs 138. Once navigation to a particular web page 140 is completed, the server-side link share application 114 may download and store the particular web page 140 to the share servers 102.

Subsequently, the server-side link share application 114 may generate a corresponding replacement URL 144 that enables access to each stored web page 140. The one or more replacement URLs 144 may be presented in portion 304 of the displayed user interface page 302. For example, as shown in FIG. 3, the replacement URLs may include the web address "http://sharelink/3uers1" that replaces the original web address, which may be "http://www.web page1.com." Likewise, the web address "http://sharelink/3uers1" may replace the original "http://www.web page2.com."

Moreover, in embodiments where the Internet user or the security application 136 has provided an optional password, the password may be displayed in portion 306. Further, in additional embodiments, the security application 136 may also implement one or more access control settings the Internet user selected via the option menu 208. Subsequently, the server-side link share application 114 may display the implemented access control settings in a review portion 308. In at least one embodiment, the server-side link application 136 may also provide a change setting button 310 on the user interface page 302. In some embodiments, the change setting button 310 may enable the Internet user the return to the user interface page 202, where the Internet user may adjust the access control settings. The user interface page 302 may further include a share another link button 312 that enables the Internet user to navigate to a new version of the user interface page 202 so that one or more additional links may be saved and shared.

Otherwise, having obtained the one or more replacement URLs 144, the Internet user may share the replacement URLs 144 with other recipient Internet users. In various examples, the Internet user may email, text message, post on a website, the replacement URLs 144 to the recipient Internet users. In turn, a recipient user may access a stored web page 140 by entering a corresponding replacement URL into an address bar of a web browser, such as the web browser 134. As shown in FIG. 4, the recipient user may be requested by the security component 118 to provide access control information prior to being provided with access to a particular stored web page 140.

FIG. 4 shows an illustrative screenshot of a user interface page 402 that may be encountered by a recipient Internet user during access to a particular stored web page 140 via replacement URL 144. For example, the recipient Internet user may have entered a replacement URL 144, or the web address "http://sharelink/3uers1", into an address bar of a web browser, such as the web browser 134. Accordingly, the web browser 134 may contact the server-side link server application 114. In turn, the server-side link share application 114 may cause the security component 118 to determine whether the recipient Internet user should be granted access to the stored web page 140. In at least one embodiment, the security component 118 may generate the user interface page 402 in response to the access request.

As shown in FIG. 4, in an example where the stored web page 140 is protected by a password, the user interface page 402 may provide a message that indicates the stored web page 140 is protected, and may further provide a request that the recipient Internet user enters the appropriate password in an input box 404. If a password is entered, the recipient Internet user may submit the entered password security application via the submit button 406. Thus, assuming that the recipient Internet user entered the correct password, the security component 118 may allow the server-side link share application 114 to provide the stored web page 140 to the user. Otherwise, the security component 118 may display a message to the recipient Internet user that indicates access to the stored web page 140 has been denied.

In other embodiments where access control to the stored web page 140 may be based on other Internet user identifiers (e.g., names, email addresses, user logins, electronic certificates, etc.), the security component 118 may also generate other appropriate prompts and/or input fields to enable the input of suitable authentication information by the recipient Internet user.

In additional embodiments, access to the stored web page 140 may be based on authentication information that may be automatically obtained by the security component 118. Such authentication information may include, but is not limited to, browser session identifier, network IP address of the electronic device 104 that is running the web browser 134, stored name, stored email address, stored login identifier, stored electronics certificate, or hashes of such authentication information.

Thus, in such embodiments, the security component 118 may skip the display of any appropriate prompts and/or input fields. Instead, the security application 136 may automatically extract such information from the electronic device 104 that is used by the recipient Internet user. In some of such embodiments, the security component 118 may use an application 130 that is a plug-in extension of the server-side link share application 114 to automatically extract the authentication information. In some embodiments, the security component 118 may seek permission from the recipient Internet user prior to extracting the authentication information. For example, the security application may cause the application 114 to generate and display a permission prompt on the user interface page 402, a different web page, or a pop-up dialogue box prior to collecting the authentication information. In turn, the recipient Internet user may allow or disallow the collection by submitting a response to the security component 118 in response to the permission prompt.

Having obtained the authentication information, the security component 118 may provide the stored web page 140 to the Internet user when the authentication information indicates that the recipient Internet user has access. Otherwise, the security component 118 may display a web page to the recipient Internet user that indicates access to the stored web page 140 has been denied. In some embodiments, the security component 118 may also generate the reason for denial that is displayed on the browser (e.g., such as digital certificate is invalid, IP address is incorrect, stored login incorrect, etc.).

Client-Side Link Share Implementations

Figure 5:
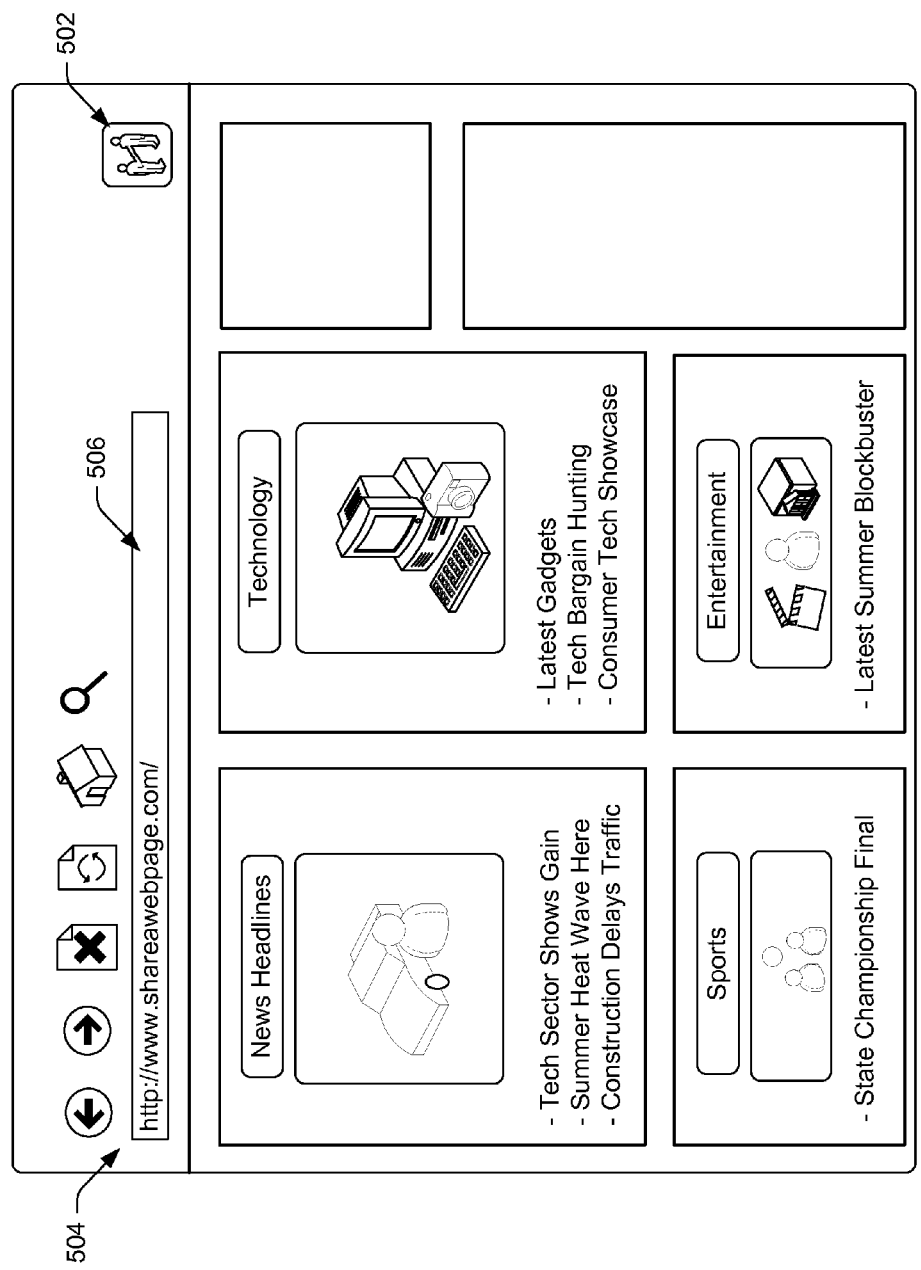
FIG. 5 shows an illustrative screenshot link input interface of a client-side link share application that implements consistent link sharing.
Figure 6:
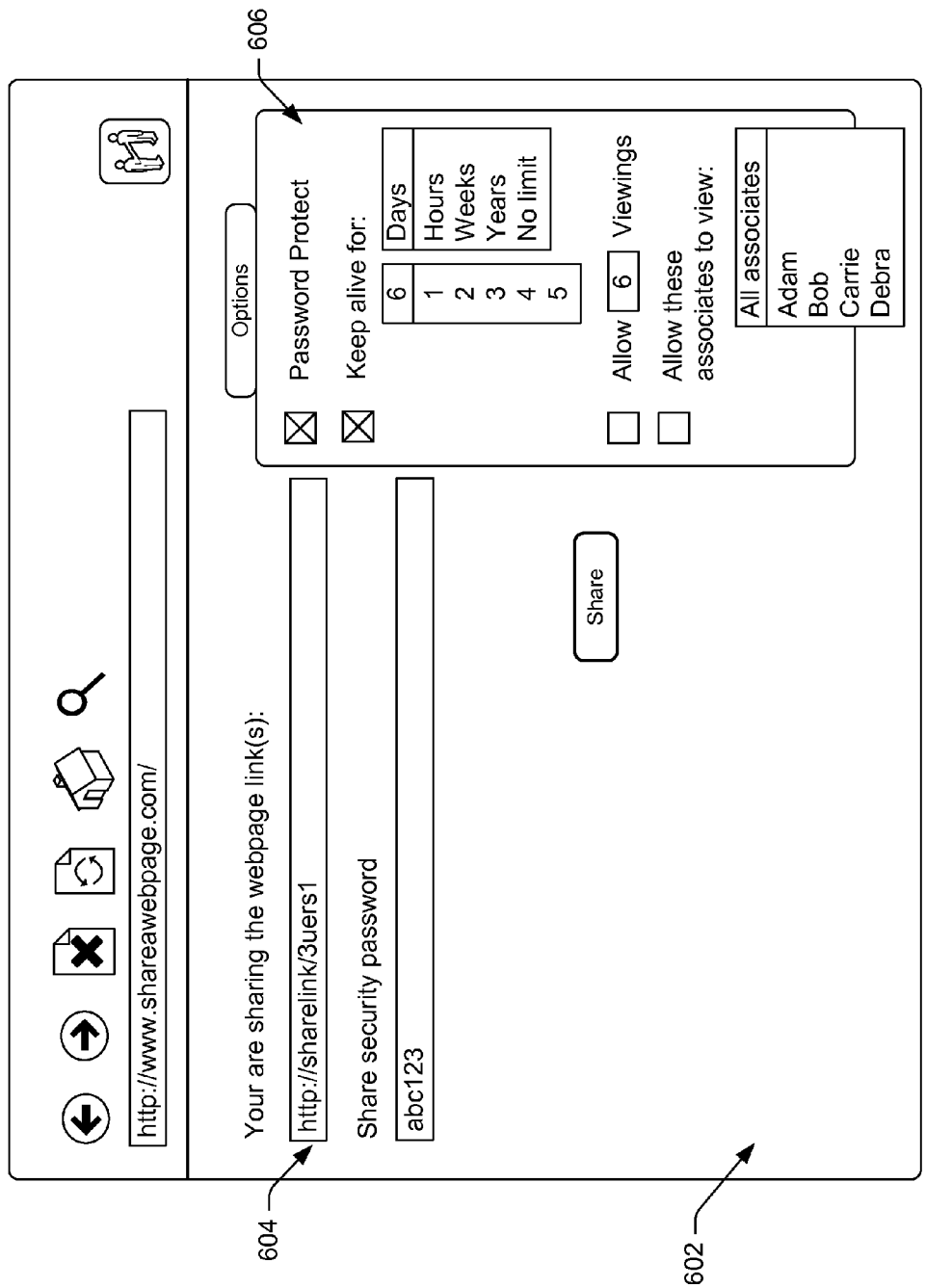
FIG. 6 shows an illustrative screenshot link output interface of a client-side link share application that implements consistent link sharing.

FIGS. 5 and 6 show illustrative screenshots of consistent link sharing that is implemented by the client-side link share application 130. As shown, the client-side link share application 130 may be accessible via an icon 502 that is placed in a user interface portion 504 of the web browser 134. Accordingly, the Internet user may share the web page 140 by initially typing a corresponding URL into an address bar 506 of the web browser 134 to load the web page 140. Once the web page is loaded from the originating web server 142 to an electronic device 104, the Internet user may activate the client-side link share application 130 via the icon 502, such as by clicking the icon. Once activated, the client-side link share application 130 may redirect the web browser 134 to the user interface page 602 shown in FIG. 6.

As shown in FIG. 6, the client-side link share application 130 may generate a replacement URL 144 that is displayed in portion 604 of the web page 306. Additionally, in some embodiments, the client-side link share application 130 may upload the web page 140 to the one or more share servers 102 for storage. However, in other embodiments, the client-side link share application 130 may activate the server-side link share application 114 to directly obtain and store the web page 140 in the one or more share servers 102. The replacement URL 144 may enable access to the stored web page 140 in the share servers 102.

In further embodiments, the client-side link share application 130 may also use the security component plug-in 136 that resides on the electronic device 104 to configure access control settings for the stored web page 140. As further shown in FIG. 3, the security component plug-in 136 may provide an option menu 606 on the web page 306. In various embodiments, the security component plug-in 136 may function in a substantially similar manner as the security component 118 to enable the Internet user to set up access control settings for the stored web page 140 via the option menu 606. In other words, the option menu 606 may also function in a substantially same manner as the option menu 208 described in FIG. 2. Once the Internet user has configured the appropriate access control settings for the stored web page 140, the security component plug-in 136 may communicate the access control settings to the security component 118, so that the security component 118 may protect the stored web page 140. In some embodiments, the application 130 may also generate a web page that is similar to the user interface page 202 shown in FIG. 2 to enable the Internet user to change access control settings during configuration.

It will be appreciated that as described above, the Internet user may share the one or more replacement URLs 144 with one or more recipient Internet users. In various examples, the Internet user may email, text message, or post on a website, the one or more replacement URLs 144 to the one or more recipient Internet users. In turn, a recipient user may access a stored web page 140 by entering a corresponding replacement URL into an address bar of a web browser, such as the web browser 134. Likewise, the recipient user may also be requested by the security component 118 to provide access control information during the access of the stored web page 140, as previously describe with respect to FIG. 4.

Multiple-Link Share Implementations

Figure 7:
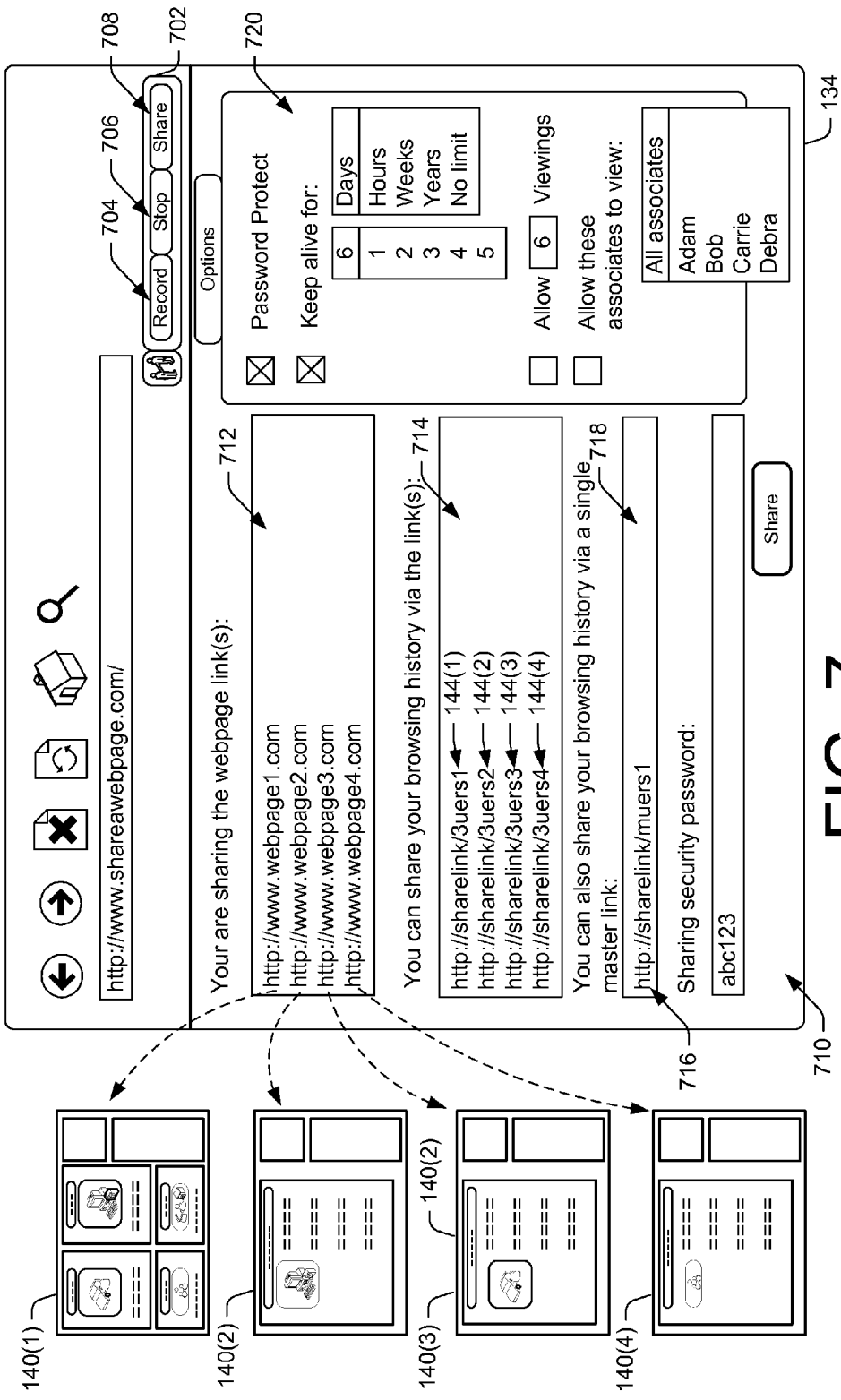
FIG. 7 shows an illustrative screenshot of web browsing history input for consistent link sharing that is facilitated by a client-side link share application.
Figure 8:
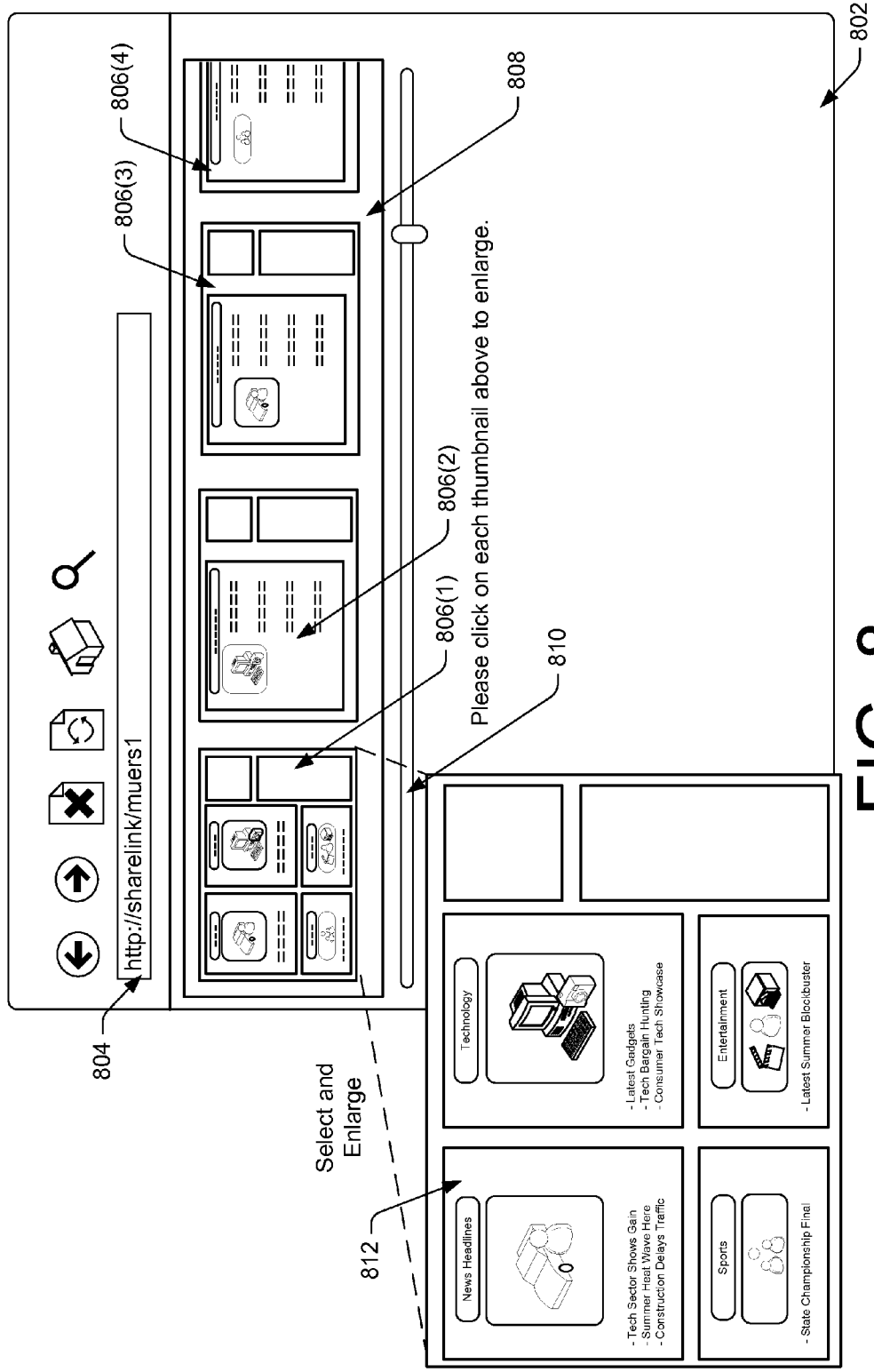
FIG. 8 shows an illustrative screenshot of thumbnail web browsing history output by a client-side link share application that implements consistent link sharing.
Figure 9:
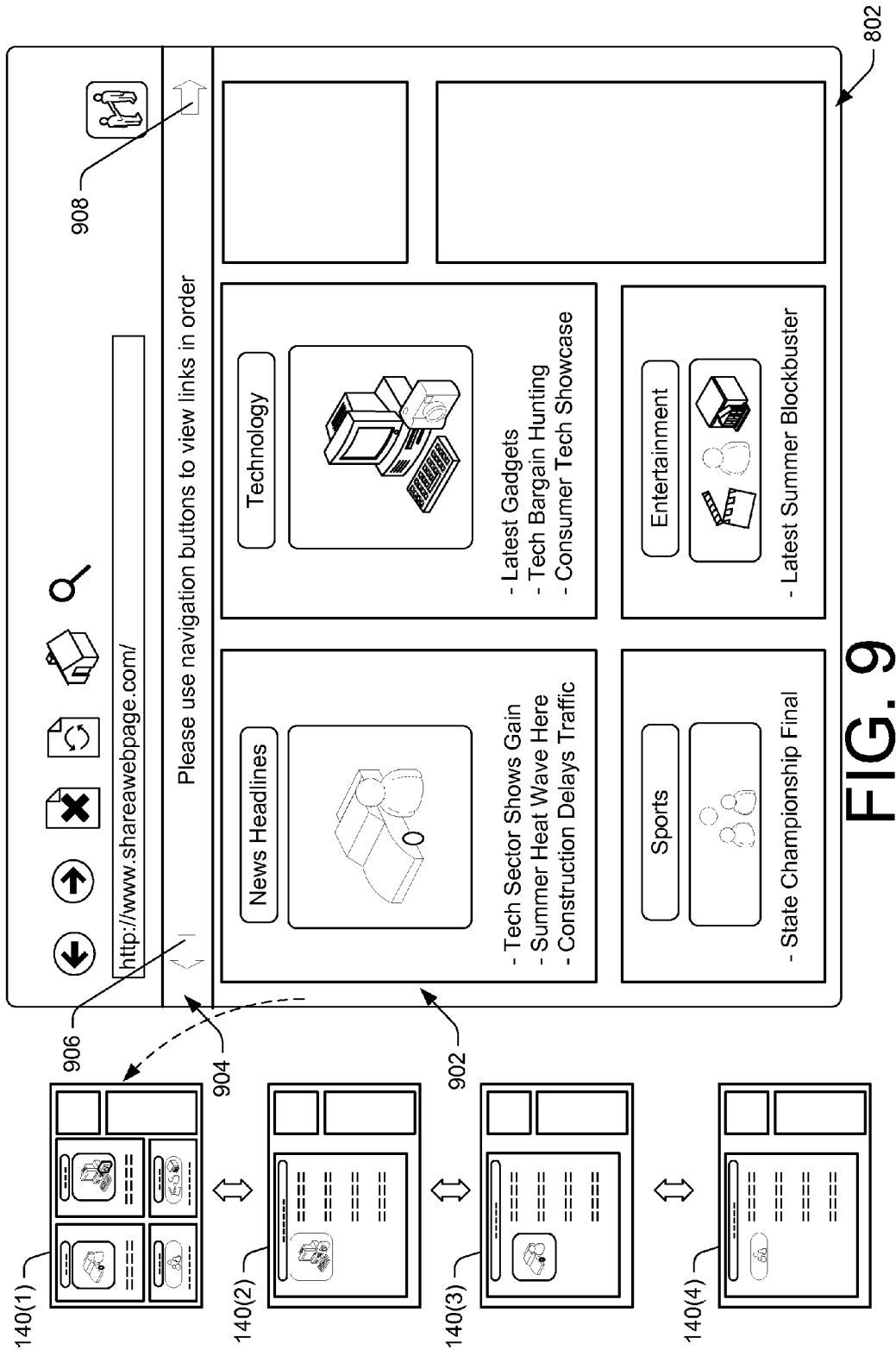
FIG. 9 shows an illustrative screenshot of navigable web browsing history output by a client-side link share application that implements consistent link sharing.

FIGS. 7-9 show illustrative screenshots of multiple links sharing that is implemented by the client-side link share application 130. Multiple link sharing may refer to the sharing of multiple original links that are part of a browsing history. In various embodiments, the client-side link share application 130 may achieve multiple links sharing by automatically recording the web browsing history of the Internet user over a time period, and then storing the web pages 140 that are visited by the Internet user in the one or more share servers 102.

As shown in FIG. 7, the various functions of the client-side link share application 130 may be accessible via buttons that are placed in a user interface portion 702 of a web browser, such as the web browser 134. The buttons may include a record button 704, a stop button 706, and a share button 708. In some embodiments, the Internet user may activate the record button 704 to begin the recording of his/her web browsing history, and activate the stop button 706 to terminate the recording. For example, the Internet user may activate the record button 704 to starting browsing history recording. The Internet user may then browse through a sequence of web pages 140(1)-140(4). It will be appreciated that the sequence of web pages 140(1)-140(4) may be web pages from different websites, or different web pages of a single website. Because the record button 704 has been activated, the server-side link share application 114 may track each of the web pages 140(1)-140(4) as visited by the Internet user. Subsequently, the Internet user may activate the stop button 706 to terminate the browsing history recording. In order to share the web pages 140(1)-140(4), the Internet user may activate the share button 708.

As shown in FIG. 7, the activation of the share button 708 may cause the client-side link share application 130 to display a user interface page 710 in the web browser 134. The user interface page 710 may include a portion 712 that displays the URLs of a plurality of web pages, such as the web pages 140(1)-140(4), as visited by the Internet user. Additionally, the application 130 may also cause the web pages 140(1)-140(4) to be stored in the one or more share servers 102. The client-side link share application 130 may also generate corresponding replacement URLs 144(1)-144(4) that provide access to the stored web pages 140(1)-140(4). The application may display the replacement URLs 144(1)-144(4) in a portion 714. For example, replacement URL 144(1) may provide access to the stored web page 140(1), and replacement URL 144(2) may provide access to the stored web page 712, and so on and so forth.

In some embodiments, as further described below, the client-side link share application 130 may store the web pages 140(1)-140(4) as a linked group. Thus, in such embodiments, the client-side link share application 130 may generate a master replacement URL 716 that may be used to provide access to all of the web pages 140(1)-140(4). As shown in FIG. 7, the client-side link share application 130 may display this master replacement URL 716 in a portion 718 of the user interface page 710. It will be appreciated that the client-side link share application 130 may present the portion 718 concurrently or in place of the portion 714.

In further embodiments, the client-side link share application 130 may also use the security component plug-in 136 that resides on the electronic device 104 to configure access control settings for the stored web pages 140(1)-140(4). As further shown in FIG. 7, the security component plug-in 136 may provide an option menu 720 on the user interface page 710. In various embodiments, the security component plug-in 136 may function in a substantially similar manner as the security component 118 to enable the Internet user to set up access control settings for the stored web pages 140(1)-140(4) via the option menu 720. In other words, the option menu 720 may also function in a substantially same manner as the option menu 208 described in FIG. 2. Once the Internet user has configured the appropriate access control settings for the stored web pages 140(1)-140(4), the security component plug-in 136 may communicate the access control settings to the security component 118, so that the security component 118 may protect the stored web pages 140(1)-140(4). In some embodiments, the client-side link share application 130 may also generate a web page that is similar to the user interface page 202 as shown in FIG. 2 to enable the Internet user to change access control settings during configuration.

It will be appreciated that as described above, the Internet user may share the one or more of the replacement URLs 140(1)-140(4), and/or the master replacement URL 716, with one or more recipient Internet users. In various examples, the Internet user may email, text message, or post on a website, one or more of the replacement URLs to the one or more recipient Internet users. In turn, a recipient user may access a stored web page 140 by entering a corresponding replacement URL into an address bar of a web browser, such as the web browser 134. Likewise, the security component 118 may also request the recipient user to provide access control information during the access of the stored web page 140, as previously describe with respect to FIG. 4.

FIG. 8 shows an illustrative screenshot of a user interface page 802 that enables an Internet user to view a plurality of web pages that are stored on one or more share servers 102, such as the stored web pages 140(1)-140(4). The user interface page 802 may be displayed by a web browser, such as the web browser 134. Moreover, the stored web pages may be part of the browsing history that is described with respect to FIG. 7. In various embodiments, a recipient Internet user may cause the server-side link share application 114 to display the user interface page 802 by inputting the master replacement URL 716 (e.g., the web address "http://sharelink/muers1") into an address bar 804 of the web browser 134.

In response, the server-side link share application 114 may display the web pages 140(1)-140(4) in the user interface page 802. In some embodiments, the server-side link share application 114 may display one or more selectable icons, e.g., selectable icons 806(1)-806(4) that represent the stored web pages, such as the stored web pages 140(1)-140(4). In at least one embodiment, each of the one or more selectable icons may be thumbnail mages. The server-side link share application 114 may also display the one or more selectable icons in a window 808 with at least one navigation control 810 (e.g., horizontal and/or vertical scroll bars). In the window 808, the one or more selectable icons may be ordered (e.g., left to right) across the user interface page 802 according to their order in the browsing history (e.g., oldest access to most recent access, most recent access to oldest access, etc.). However, it will be appreciated that the one or more selectable icons, such as the selectable icons 806(1)-806(4), may be arranged in other ways to represent their order in the browsing history.

As further shown in FIG. 8, the selection of one of the selectable icons 806(1)-806(4) may cause the server-side link share application 114 to display an enlarged version of the corresponding stored web page, such as version 812. The enlarged version 812 of the stored web page may be an image, or alternatively, a web page of static and/or dynamic objects. In some embodiments, the server-side link share application 114 may display the enlarged version (e.g., static and/or dynamic object version) in a new web page that replaces the user interface page 802. In other embodiments, the server-side link share application 114 may display the enlarged version (e.g., image version) in a portion of the user interface page 802. In at least one embodiment, the enlarged version may be appropriately formatted for display in the portion of the user interface page 802 by the reformat module 146.

FIG. 9 shows an illustrative screenshot of an alternative implementation of the user interface page 802 by the server-side link share application 114. Once again, a recipient Internet user may cause the server-side link share application 114 to display the user interface page 802 by inputting the master replacement, such as the master replacement URL 716 (e.g., the web address "http://sharelink/muers1") into an address bar 804 of the web browser 134. In response, the server-side link share application 114 may present a viewing portion 902 on the user interface page 802 that displays one of the stored web pages (e.g., stored web pages 140(1)-140(4)) at any given time. The application 130 may also present a navigation portion 904 that enables the recipient Internet user to change the web page that is being displayed in the viewing portion 902. Accordingly, the application 130 may initially display one of the stored web pages (e.g., web page 140(1)) that is part of a browsing history. For example, the displayed web page may be one of the oldest web pages in the browsing history.

The navigation controls 902 may include selectable arrows 906-908, where the arrows 906-908 may advance the currently displayed web page to a next web page in the browsing history (e.g., more recent in time), or roll back the currently displayed web page to a previous web page in the browsing history (e.g., older in time). Thus, as shown in FIG. 9, the recipient Internet user may chronologically view each of the stored web pages 140(1)-140(4) via the selectable arrows 906-908.

In various embodiments, the server-side link share application 114 may modify each of the stored web pages, such as the web page 140, to fit the proportions (e.g., pixel dimensions) of an electronic display on an electronic device 104 whenever a stored web page 140 is provided to a recipient Internet user for display. For example, in an instance where the stored web page 140 includes static and/or dynamic objects that are formatted for display on a desktop monitor, the application 114 may use the reformat component 122 to reformat the static and/or dynamic objects of the web page 140.

Further, in the embodiments described in FIGS. 7 and 8, the server-side link share application 114 may use a comparison component 120 to verify that an original version of the stored web page, such as the web page 140(1), is no longer available on an originating web server 142 prior to providing the stored web page to the recipient Internet user. In instances where the original version is available, the server-side link share application 114 may provide the original version to the recipient Internet user.

Illustrative Operations

Figure 10:
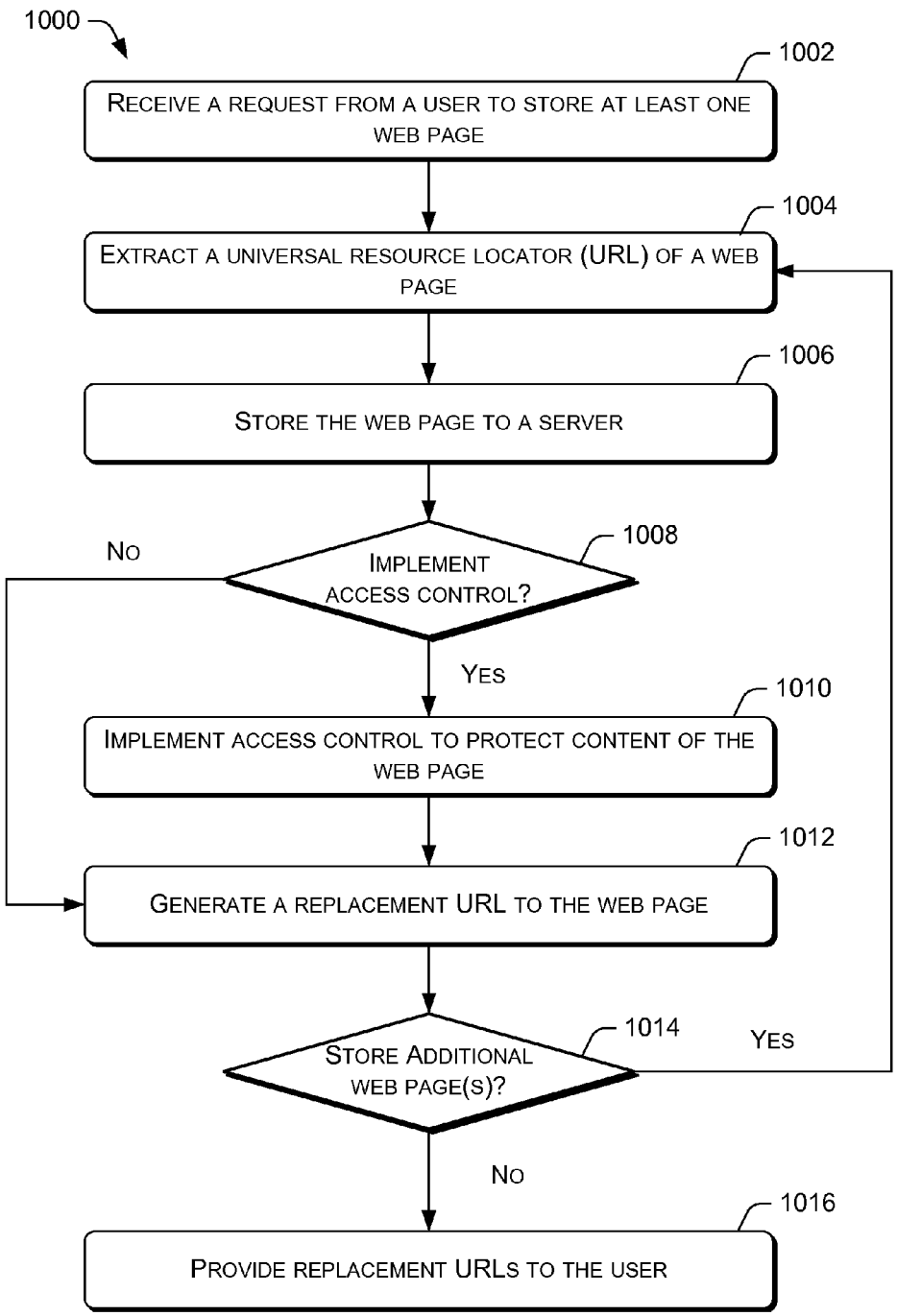
FIG. 10 is a flow diagram of an illustrative process for automatically storing one or more web pages that are associated with at least one corresponding universal resource locator (URL) upon request.
Figure 11:
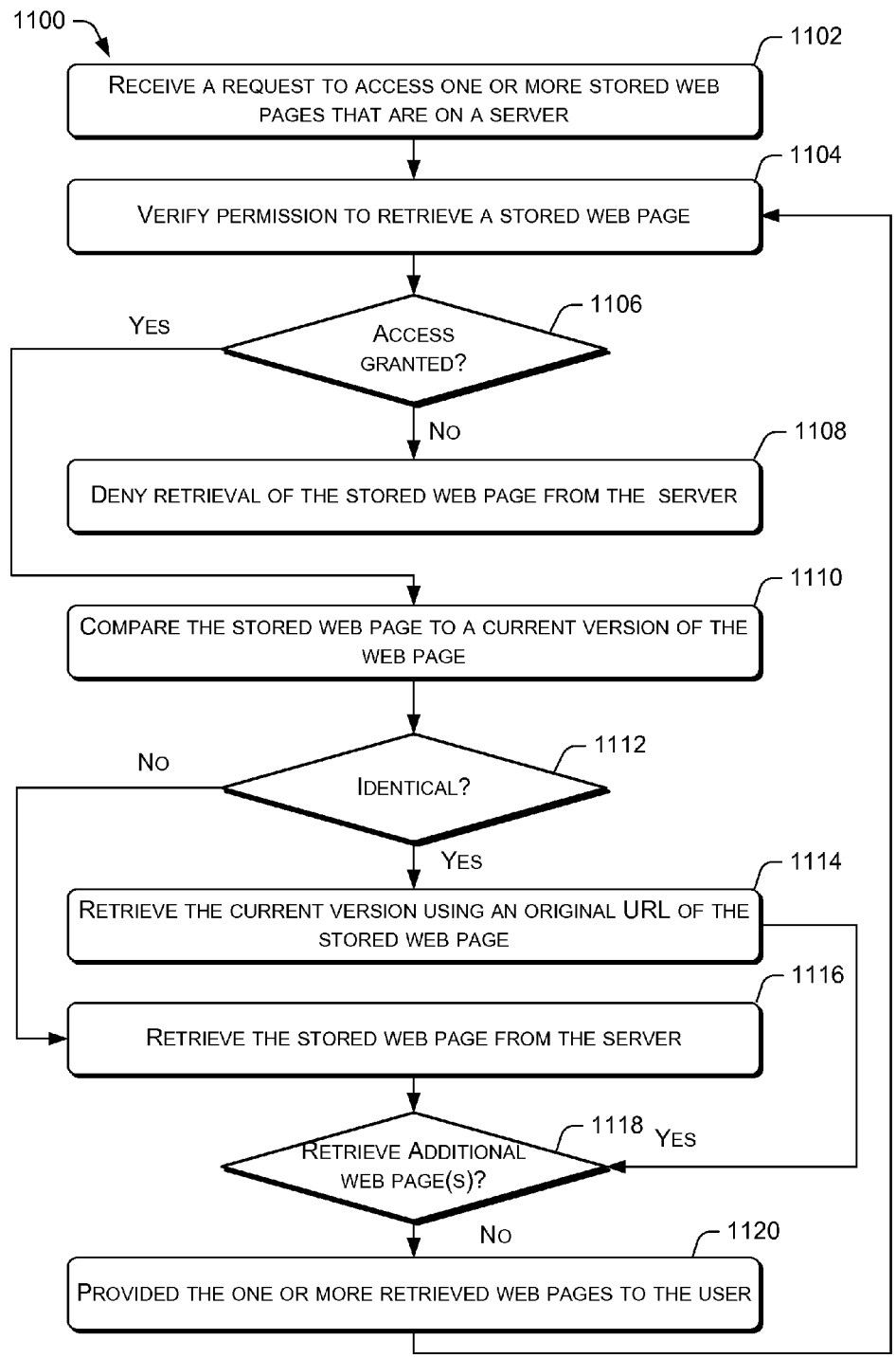
FIG. 11 is a flow diagram of an illustrative process for providing access to one or more stored web pages that are associated with requested universal resource locators (URLs).

FIG. 10 and FIG. 11 show illustrative processes 1000-1100 for implementing consistent link sharing on one or more electronic devices 104. Each of the processes 1000-1100 is illustrated as a collection of blocks in a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 1000-1100 are described with reference to the computing environment 100 of FIG. 1.

FIG. 10 is a flow diagram of an illustrative process for automatically storing web content of one or more web pages that are associated with corresponding universal resource locators (URLs) upon request.

At block 1002, the server-side link share application 114 may receive a request from a user to store at least one web page. In various embodiments, the server-side link share application 114 may receive the request when an Internet user navigates to a link share web page provided by the server-side link share application 114 and inputs one or more URLs of the corresponding web pages to be stored. The one or more web pages may be stored on the share servers 102 for later retrieval by other Internet user. At block 1004, the server-side link share application 114 may extract the URL of a web page.

At block 1006, the server-side link share application 114 may store the web page to the share servers. In various embodiments, the application 114 may navigate to an originating server that stores the web page, and downloads the web page to the share servers for storage. The application 114 may store the web page as either an image or as a web page of static and/or dynamic objects.

At decision block 1008, the server-side link share application 114 may or may not implement access control to further protect the at least one web page that is stored to the one or more share servers 102. In various embodiments, whether the application 114 implements access control may be dependent on the user input regarding the desired access control settings. Thus, if the application 114 is directed to implement access control ("yes" at decision block 1008), the server-side link share application 114 may implement access control based on the user selected settings at block 1010. In various embodiments, such settings may be implemented based on user identifiers or component characteristics of the web browsing software, hardware, or network to limit access to the stored web page to certain Internet users. After setting access control, the server-side link share application 114 may generate a replacement URL for the stored web page at block 1012.

However, if the application 114 is not directed to implement access control ("no" at decision block 1008), the server-side link share application 114 may simply generate a replacement URL for the stored web page at block 1012, bypassing the implementation of access control at block 1010. In various embodiments, the replacement URL may enable the retrieval of the stored web page from the one or more share servers 102.

At decision block 1014, the server-side link share application 114 may determine whether there are additional web pages to be stored. In some embodiments, the Internet user may have entered a plurality of URLs because the Internet user desires to store multiple web pages. Thus, if the application 114 determines at decision block 1014 that there is at least one additional web page to be stored to the share servers 102 ("yes" at decision block 1014), the process 1000 may loop back to block 1004, where the application 114 may extract the URL of another web page.

However, if the application 114 determines at decision block 1008 that there are no more additional web pages to be stored to the one or more share servers 102 ("no" at decision block 1008), the server-side link share application 114 may present the replacement URLs to the Internet user at block 1016. In this way, the Internet user may share the one or more replacement URL at least one recipient Internet users.

It will be appreciated that while process 1000 is described above with respect to the server-side link share application 114, one or more blocks of the process 1000 may also be implemented by a client-side link share application 130 in cooperation with the server-side link share application 114. In some embodiments, the client-side link share application 130 may be configured to store browsing history for an Internet user. Thus, the application 130 may cause a plurality of web pages to be stored to the one or more share servers 102.

FIG. 11 is a flow diagram of an illustrative process for providing stored web content of one or more web pages that are associated with requested universal resource locators (URLs).

At block 1102, the server-side link share application 114 may receive a request to access one or more stored web pages that are on the share servers 102. In various embodiments, the request may be in the form of a replacement URL that a recipient Internet user received and provided to the application 114 via a web browser. The stored web page may be a duplicate of a web page from an originating server that was previously stored to the share servers 102.

At block 1104, the server-side link share application 114 may use the security component 118 to verify that the recipient Internet user has permission to access the stored web page. In various embodiments, the recipient Internet user may have been granted permission by the Internet user that stored the web page to the one or more share servers 102. The recipient Internet user may have been granted permission based on an user identifier of the recipient Internet user, or component characteristics of the web browsing software, hardware, or network that is associated with the recipient Internet user. In some embodiments, the recipient Internet may be prompted to enter authentication information via the web browser (e.g., a password that is transmitted to the recipient Internet user by the Internet user that stored the web page, authentication login name, identifiers, electronic authentication certificate, etc.). The access control settings that either grants or denies permission to the recipient may be stored by the application 114.

At decision block 1106, if the server-side link share application 114 determines that the recipient Internet user does not have permission to access the stored web page ("no" at decision block 1106), the server-side link share application 114 may deny the recipient user access to the stored web page that corresponds to the replacement URL at block 1108. Additionally, the application 114 may present a message to the recipient Internet user via the web page that indicates access to the stored web page is denied. In some embodiments, the message may also indicate the reason for denial (e.g., invalid IP address, invalid password, etc.).

However, returning to decision block 1106, if the server-side link share application 114 determines that the recipient Internet user does have permission to access the web page ("yes" at decision block 1106), the server-side link share application 114 may use a comparison component 120 to compare the stored web page that is on the one or more share servers 102 with a current version of the stored web page on the originating server at block 1110. In various embodiments, the comparison component 120 may converted the stored web page and the current version of the stored web page into the same representational format (e.g., image) for comparison.

At block decision 1112, if the server-side link share application 114 determines via the comparison component 120 that the stored web page and the current version of the web page are identical ("yes" at decision block 1112), the application 114 may redirect the web browser to retrieve a current version of the web page using an original URL of the stored web page from an originating server 142 at block 1114. Subsequently, the process 1100 may proceed directly to decision block 1118. However, in some special conditions, the application 114 may retrieve the stored web page that corresponds to the replacement URL from the one or more shared servers 102 rather than retrieve the current version at block 1114, even when the stored web page and the current version are identical. These special conditions may include a directive to the application 114 to always provide the stored web page, a directive to the application 114 to provide additional information with the stored web page in response to the request, or a failure of the originating server 142 to provide the current version of the stored web page within a predetermined time period_in response to the request.

However, if the server-side link share application 114 determines that the stored web page and the current version of the web page are not identical ("no" at decision block 1112), the application 114 may retrieve the stored web page that corresponds to the replacement URL from the one or more share servers 102 at block 1116.

At decision block 1118, the server-side link share application 114 may determine whether there is at least one additional stored web page to be accessed. In various embodiments, the application 114 may have received a request to access a plurality of web pages via multiple replacement URLs, or a master replacement URL that enables access to multiple web pages. Thus, if the application 114 determines that there is at least one additional stored web page to be accessed ("yes" at decision block 1118), the process 1100 may loop back to block 1104. However, if the application 114 determines that there are no additional stored web pages to be accessed ("no" at decision block 1118), the server-side link share application 114 may provide the one or more retrieved web pages to the recipient Internet user via the web browser at block 1120. In various embodiments in which a plurality of web pages is retrieved from the one or more share servers 102, the application 114 may be provided the plurality of web pages as a sequentially accessible group in the web browser.

Each of the one or more web pages may be provided as an image, or an assembled web page of static and/or dynamic objects.

In summary, consistent link sharing in accordance with the various embodiments may assure Internet users that one or more web pages, or the web content in the one or more web pages, are preserved in their existing states for a desired time period. Moreover, the Internet users may be further assured that the replacement URLs that they provide to other recipient Internet users will reliably point to the one or more web pages or web content they wish to share. Thus, consistent link sharing may enable Internet user to take advantage of the dynamic and up-to-date nature of the content on the Internet, while mitigate the negative impact of obsolete or out of date links.

Further, in some instances, consistent link sharing may enable an Internet user to voluntarily share an access restricted web page with a recipient Internet user that would be otherwise unable to view the access restricted web page. For example, an Internet user having technical difficulties with the content in a password protected web page may initially access the password protected web page with the appropriate password. The Internet user may then share the password protected web page with a service representative to obtain technical assistance. In such an example, consistent link sharing may enable the Internet user to obtain the desired assistance without compromising the password that protects the access restricted web page.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer implemented method, comprising:
under control of one or more computing systems configured with executable instructions,
receiving a request to store a web page that resides on an originating server, the request including a universal resource locator (URL) of the web page;
storing the web page to one or more share servers of a content distribution network (CDN);
generating a replacement URL that accesses the stored web page on the one or more share servers;
restricting access to the stored web page to one or more privileged users;
comparing the stored web page to a current version of the stored web page that is stored on the originating server;
directing a user that submits the replacement URL to the current version of the stored web page on the originating server when the one or more share servers determine that the user is one of the one or more privileged users and the stored web page and the current version are identical; and
providing the stored web page to the user that submits the replacement URL when the one or more share servers determine that the user is one of the one or more privileged users and the stored web page is different from the current version.

2. The computer implemented method of claim 1, where the storing includes storing the web page to one or more share servers at an edge location of the CDN.

3. The computer implemented method of claim 1, wherein:
the restricting comprises restricting access based on one or more identifying properties of each privileged user, the identifying properties including at least one of one or more user identifiers of each privileged user or one or more characteristics of a web browsing component under control of each privileged user; and
the providing comprises granting the user access to the stored web page when the one or more share servers determine based on the one or more identifying properties of the user that the user is one of the one or more privileged users.

4. The computer implemented method of claim 3, wherein the one or more user identifiers include at least one of email address, user login, cookie information, or electronic certificate, and wherein one or more characteristics include at least one of operating system product key, IP address, browser session identifier (ID), or electronic device identifier.

5. The computer implemented method of claim 1, wherein:
the restricting comprises restricting access based on a hash of one or more identifying properties of each privileged user, the identifying properties including at least one of one or more user identifiers of each privileged user or one or more characteristics of a web browsing component under control of each privileged user; and
the providing comprises granting the user access to the stored web page when the one or more share servers determine based on a hash of the one or more identifying properties of the user that that the user is one of the one or more privileged users.

6. The computer implemented method of claim 1, wherein:
the restricting comprises restricting access based on one or more identifying properties of each privileged user, the identifying properties including at least one of one or more user identifiers of each privileged user or one or more characteristics of a web browsing component under control of each privileged user,
further comprising denying a user access to the stored web page when the one or more share servers determine based on the one or more identifying properties of the user that the user is not one of the one or more privileged users.

7. The computer implemented method of claim 1, wherein the restricting includes restricting access to the web page based on a password, the one or more privileged users being in possession of the password.

8. The computer implemented method of claim 1, wherein the restricting includes restricting access to the web page based on a password that is generated by the one or more share servers, the one or more privileged users being in possession of the password.

9. The computer implemented method of claim 1, wherein the restricting includes restricting access to the stored web page via the replacement URL to a predetermined number of the one or more privileged users based on a browser session identifier (ID) of a browser used to submit the replacement URL, an Internet Protocol (IP) address of a electronic device used by each privileged user, or a login identifier of each privileged user.

10. The computer implemented method of claim 1, wherein the restricting includes restricting access to the stored web page via the replacement URL to a predetermined number of the one or more privileged users based on a hash of at least two of a plurality of identifying properties of each privileged user, the plurality of identifying properties including browser session identifier (ID) of a browser used to submit the replacement URL, an Internet Protocol (IP) address of a electronic device used by each privileged user, or a login identifier of each privileged user.

11. The computer implemented method of claim 1, the restricting includes restricting access to the stored web page via the replacement URL to a predetermined number of browser sessions, wherein the one or more privileged users initiated the predetermined number of browser sessions.

12. The computer implemented method of claim 1, the restricting includes restricting access to the stored web page via the replacement URL to a predetermined time duration, wherein the one or more privileged users accessed the stored web page within the predetermined time duration.

13. A computer implemented method, comprising:
under control of one or more computing systems configured with executable instructions,
receiving a request to store a web page that resides on an originating server onto a share server, the request being from a client device and including a universal resource locator (URL) of the web page;
storing the web page to the share server;
generating a replacement URL that accesses the stored web page on the share server, the replacement URL being different from the URL of the web page;
comparing the stored web page to a current version of the stored web page that is stored on the originating server;
directing a user that submits the replacement URL to the current version of the stored web page on the originating server in response to the share server determining that the stored web page and the current version are identical; and
providing the stored web page to a user that submits the replacement URL in response to the share server determining that the stored web page is different from the current version.

14. The computer implemented method of claim 13, further comprising generating a web page via a server-side application to solicit the URL from a user.

15. The computer implemented method of claim 13, wherein the storing includes storing the web page in an image format or an object-based format.

16. The computer implemented method of claim 13, wherein the receiving includes receiving the request to store the web page from a client-side application on the client device.

17. The computer implemented method of claim 13, wherein the receiving includes receiving the request to store the web page from a client-side application on the client device that is accessible via an icon on a user interface of a web browser.

18. The computer implemented method of claim 13, wherein the receiving includes receiving a request to store a plurality of web pages from a client-side application that resides on the client device, the plurality of web pages being part of a web browsing history that is recorded by the client-side application.

19. The computer implemented method of claim 13, further comprising restricting access to the stored web page on the share server to one or more privileged users, wherein the providing includes providing the stored web page when the share server determines that the user is a privileged user.

20. The computer implemented method of claim 13, further comprising restricting access to the stored web page to one or more privileged users, wherein the directing includes directing the user to the current version of the stored web page on the originating server in response to the share server determining that the stored web page and the current version are identical and the user is one of the one or more privileged users, and wherein the providing includes providing the stored web page to the user in response to the share server determining that the stored web page is different from the current version and the user is one of the one or more privileged users.

21. The computer implemented method of claim 13, further comprising restricting access to the stored web page to one or more privileged users, wherein the providing the stored web page to the user that submits the replacement URL includes providing the replacement URL when the share server determines that the user is one of the one or more privileged users and the stored web page is different from a current version of the stored web page that is stored on the originating server.

22. A computer implemented method, comprising:
under control of one or more computing systems configured with executable instructions,
receiving a request to store a web page from an originating server, the request including a universal resource locator (URL) of the web page;
storing the web page to one or more share servers;
generating a replacement URL that accesses the stored web page on the one or more share servers;
receiving a request to access the stored web page via the replacement URL from a user;
comparing the stored web page to a current version of the stored web page that is stored on the originating server;
providing the stored web page to the user from the one or more shared servers at least when the stored web page is different from the current version and a special condition exists;
directing the user to the current version of the stored web page on the originating server when the stored web page and the current version are identical and the special condition does not exists;
providing the stored web page to the user from the one or more shared servers at least when the stored web page is different from the current version and the special condition does not exists; and
wherein the special condition is one of a directive to always provide the stored web page, a directive to provide additional information with the stored web page in response to the request, or a failure to provide the current version of the stored web page within a predetermined time period in response to the request.

23. The computer implemented method of claim 22, wherein the storing includes storing the web page in an image format or an object-based format.

24. The computer implemented method of claim 22, further comprising restricting access to the stored web page to one or more privileged users, wherein the directing includes directing the user to the current version of the stored web page on the originating server when the stored web page and the current version are identical and the one or more share servers determine that the user is one of the one or more privileged users.

25. The computer implemented method of claim 24, wherein the restricting includes restricting access to the stored web page based on a password, the one or more privileged users being in possession of the password.

26. The computer implemented method of claim 24, wherein the restricting includes restricting access based on one or more identifying properties of each privileged user, the identifying properties including at least one of one or more user identifiers of each privileged user or one or more characteristics of a web browsing component under control of each privileged user.

27. The computer implemented method of claim 26, wherein the one or more user identifiers include at least one of email address, user login, cookie information, or electronic certificate, and wherein one or more characteristics include at least one of operating system product key, Internet Protocol (IP) address, browser session identifier (ID), or electronic device identifier.

28. The computer implemented method of claim 26, wherein the restricting includes restricting access to the stored web page via the replacement URL to a predetermined number of the one or more privileged users based on a hash of at least two of a plurality of identifying properties of each privileged user, the plurality of identifying properties including browser session identifier (ID) of a browser used to submit the replacement URL, an Internet Protocol (IP) address of a electronic device used by each privileged user, or a login identifier of each privileged user.

29. The computer implemented method of claim 22, further comprising restricting access to the stored web page to one or more privileged users, wherein the providing includes providing the stored web page when the stored web page is different from the current version and the one or more share servers determine that the user is one of the one or more privileged users.

30. The computer implemented method of claim 22, wherein the comparing includes converting the stored web page and the current version of the stored web page to an identical format, and evaluating the stored web page and the current version in the identical format.

31. One or more non-transitory computer readable media storing computer-executable instructions that, when executed, cause one or more processors to perform acts comprising:
receiving a request to store a plurality of web pages that reside on an originating server onto a share server, the request being from a client device and including a universal resource locator (URL) for each of the plurality of web pages;
storing the plurality of web pages to the share server;
generating at least one replacement URL for the plurality of stored web pages on the share server;
receiving a request to access a stored web page of the plurality of web pages on the share server via a replacement URL from a user;
comparing the stored web page to a current version of the stored web page that is stored on the originating server;
directing the user to the current version of the stored web page on the originating server in response to the share server determining that the stored web page and the current version are identical; and
providing the stored web page to the user in response to the share server determining that the stored web page is different from the current version.

32. The one or more non-transitory computer readable media of claim 31, wherein the receiving includes receiving a request to store the plurality of web pages from a client-side application that resides on the client device, the plurality of web pages being part of a web browsing history that is recorded by the client-side application.

33. The one or more non-transitory computer readable media of claim 31, wherein the generating includes generating a master replacement URL that enables access to the plurality of stored web pages or generating a corresponding replacement URL for each of the plurality of stored web pages.

34. The one or more non-transitory computer readable media of claim 31, wherein the providing includes presenting the plurality of stored web pages as a sequence of selectable images, each of the selectable image leading to an object-based version of a corresponding stored web page.

35. The one or more non-transitory computer readable media of claim 31, wherein the providing includes presenting the plurality of stored web pages as a sequence of scrollable object-based web pages.

36. The one or more non-transitory computer readable media of claim 31, further comprising instructions that when executed, cause one or more processors to perform an act of restricting access to the plurality of stored web pages to one or more privileged user, wherein the providing includes providing the stored web page to the user when the share server further determines that the user is one of the one or more privileged users.

37. The one or more non-transitory computer readable media of claim 36, wherein:
  the restricting comprises restricting access based on one or more identifying properties of each privileged user, the identifying properties including at least one of one or more user identifiers of each privileged user or one or more characteristics of a web browsing component under control of each privileged user,
  the providing comprises granting the user access to the stored web page when the share server further determines based on the one or more identifying properties of the user that the user is one of the one or more privileged users.

38. The one or more non-transitory computer readable media of claim 37, wherein the one or more user identifiers include at least one of email address, user login, cookie information, or electronic certificate, and wherein one or more characteristics include at least one of operating system product key, Internet Protocol (IP) address, browser session identifier (ID), or electronic device identifier.

39. The one or more non-transitory computer readable media of claim 36, wherein:
  the restricting includes restricting access based on a hash of one or more identifying properties of each privileged user, the identifying properties including at least one of one or more user identifiers of each privileged user or one or more characteristics of a web browsing component under control of each privileged user,
  and the providing comprises granting the user access to the stored web page when the share server further determines based on a hash of the one or more identifying properties of the user that that the user is one of the one or more privileged users.

40. The one or more non-transitory computer readable media of claim 36, wherein the restricting includes restricting access to the web page based on a password, the one or more privileged users being in possession of the password.

41. The one or more non-transitory computer readable media of claim 31, wherein the providing includes providing the stored web page to the user from the share server at least when the stored web page is different from the current version and a special condition exists, and wherein the special condition is one of a directive to always provide the stored web page, a directive to provide additional information with the stored web page in response to the request, or a failure to provide the current version of the stored web page within a predetermined time period in response to the request.

* * * * *